Feb. 17, 1959 W. J. ZENNER 2,874,215

TWO-TAPE CIPHER SYSTEM

Filed March 23, 1955 3 Sheets-Sheet 1

INVENTOR
WALTER J. ZENNER
BY Emery Robinson
ATTORNEY

TWO-TAPE CIPHER SYSTEM

Filed March 23, 1955 3 Sheets-Sheet 2

INVENTOR
WALTER J. ZENNER
BY Emery Robinson
ATTORNEY

TWO-TAPE CIPHER SYSTEM

Filed March 23, 1955 3 Sheets-Sheet 3

INVENTOR
WALTER J. ZENNER
BY Emery Robinson
ATTORNEY

United States Patent Office 2,874,215

Patented Feb. 17, 1959

2,874,215

TWO-TAPE CIPHER SYSTEM

Walter J. Zenner, Des Plaines, Ill., assignor to Teletype Corporation, Chicago, Ill., a corporation of Delaware Application March 23, 1955, Serial No. 496,234

4 Claims. (Cl. 178—22)

This invention pertains to printing telegraph communication systems, and more particularly to cryptographic arrangements therefor.

The principal object of the invention is to provide a cryptographic system which can be used with commercial printing telegraph communication channels.

Another object of the invention is to provide means for delivering to the signal line enciphered signals suitable for use on lines monitored by page printers.

The system according to the present invention is applicable to two-tape ciphering systems wherein the code signals corresponding to the indicia carried in a message tape and a key tape are combined to produce a resultant ciphered tape suitable for transmission over commercial printing telegraph channels. Existing systems produce a ciphered tape containing random appearances of function codes. These function codes spoil the copy of page monitoring printers and may cause malfunctioning of the commercial channel controls or, in some instances, actual disconnection. The arrangement according to the present invention suppresses unwanted codes for functions during the ciphering process and in lieu thereof inserts in the ciphered message a cue so that the deciphering machine later can note the deleted code and restore it. Furthermore, during the deciphering process, the system according to the invention ignores or rejects characters which have been substituted for functions.

In the embodiment disclosed herein, the arrangement is contemplated for off-line use as an enciphering or deciphering machine. The message tape to be translated or enciphered is fed along with a key tape into a two-tape transmitter distributor which will send the cipher product in five-unit printing telegraph code to a typing reperforator which will produce the final cipher product tape. The keyboard on the typing reperforator may be used for editing.

A control key is provided to condition the equipment for enciphering, deciphering or normal transmission (plain message) from the transmitter distributor to the typing reperforator. With the control key in the "plain" position, the transmitter sends five-unit (Baudot) code signals exactly corresponding to the perforations found in the message tape. The "plain" key position is used in sending headings and endings of messages. With the control key in the "encipher" position, and with the plain message and key tapes in place, the transmitter starts to send ciphered signals. If the cipher product is a code combination for "figures," "line feed," "carriage return," "space" or "blank," the transmitter sends a "space" signal code combination as a "reread" cue, then reciphers the same message tape character (code combination) using the next character (code combination) in the key tape. At regular intervals, however, the transmitter stops ciphering long enough to send "carriage return" and "line feed." Thus, suppression of the unwanted function codes, plus automatic addition of wanted functions produces copy suitable for monitoring by a page printer which will print lines, for example, forty-five characters in length, all in lower case, with spaces randomly interspersed. Absence of upper case characters or short lines in the copy can be interpreted as a "line OK" condition by the monitoring printer attendant.

With the control key in the "decipher" position, the transmitter sends deciphered signals when the "enciphered message tape" and key tape are in place. The key tape at the deciphering position is an exact duplicate of (and must be started at exactly the same characters as) the key tape used to produce the enciphered tape. When the character identified as "space" is found or encountered in the enciphered tape, it is recognized as a cue that recipherment has taken place at the transmitting end, and accordingly, the "space" character is discarded, and the transmitter proceeds to decipher the next character after advancing both tapes.

Accordingly, a feature of the invention resides in the provision of circuit instrumentalities which are controlled to different manners in response to the random appearance of functional code combinations in the enciphered text at different times to permit the transmission of other non-functional code combinations in their stead, as well as the introduction of certain functional code combinations when required.

Another feature of the invention resides in automatically re-synchronizing the key and message tapes each time a predetermined character sequence occurs; for example, a carriage return (CR) and line feed (LF) sequence.

Another feature of the invention resides in utilizing the CR and LF codes, which have been systematically introduced during the enciphering process so that the resulting copy is such that monitor page printers can be used.

Further objects and features of this invention will appear in the following description of the preferred embodiment of the invention taken in conjunction with the accompanying drawings, wherein.

In order to encipher messages by the system of the present invention, the elements of the code combinations of the original, intelligible message are combined with the elements of code combinations provided by a key tape or other control mechanism. In such arrangement, opposite conditions, that is, with one element of the original code combination marking and with the corresponding element of the key code combination spacing, produce a marking signal. Like conditions, however, with both elements marking or both elements spacing, produce spacing signals. This presumes, of course, that each of the elements of the respective code combinations are related to each other. That is, the No. 1 element of the original code combination is combined with the No. 1 element of the key code combination, and so fourth, as described in United States Patent No. 2,403,679 granted July 9, 1946 to L. M. Potts.

Figures 2, 5:
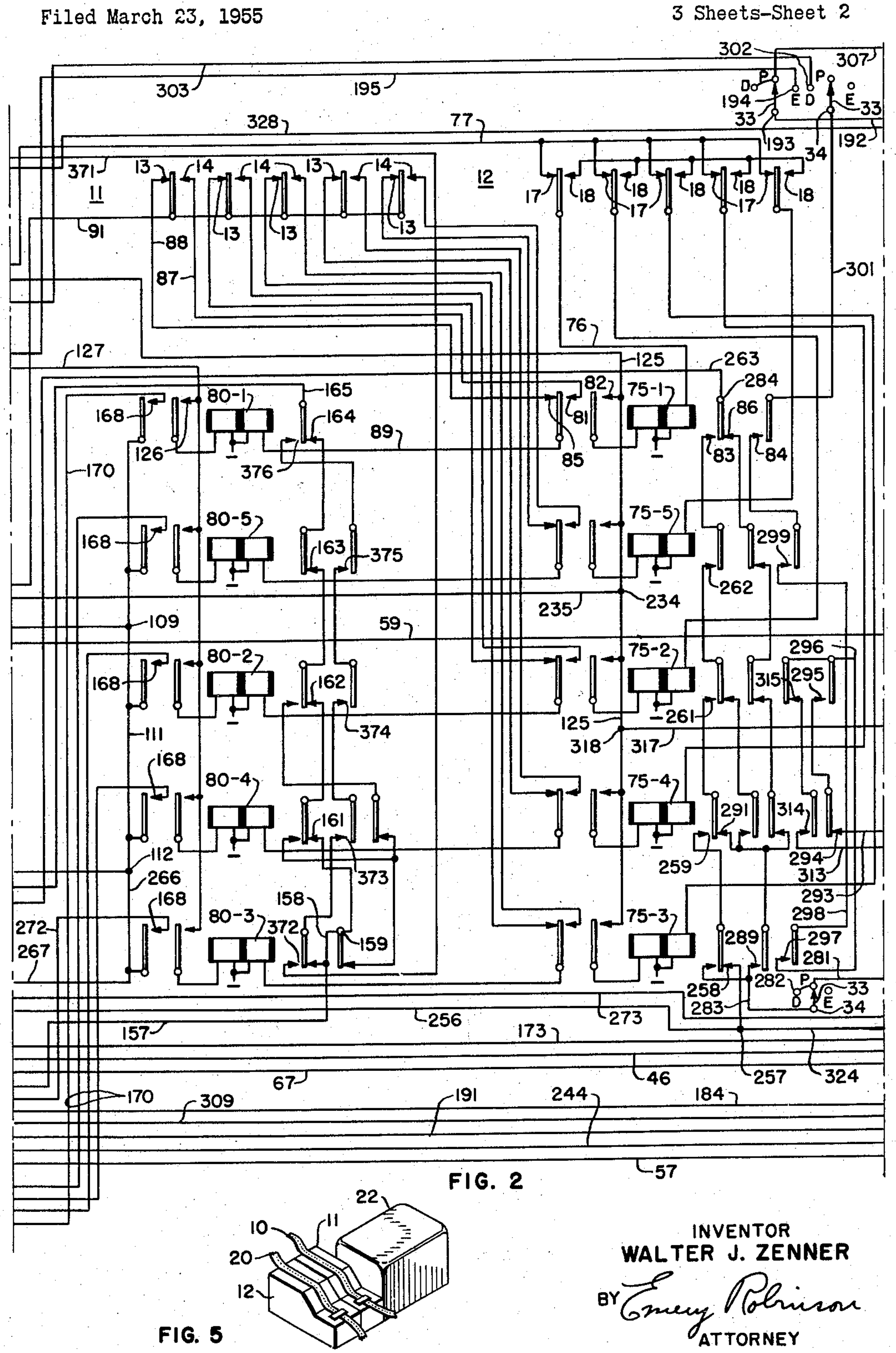
Fig. 5 is a perspective representation of the two-tape transmitter.

Having reference to Figs. 2 and 5, the present invention contemplates the utilization of two tape transmitters, identified by the numerals 11 and 12. The transmitter units 11 and 12 are described only to an extent necessary to understand the present invention and may be understood more fully by referring to Bulletin 141, issued in March 1942, by the Teletype Corporation, Chicago, Illinois, wherein said units are described substantially.

Figure 1:
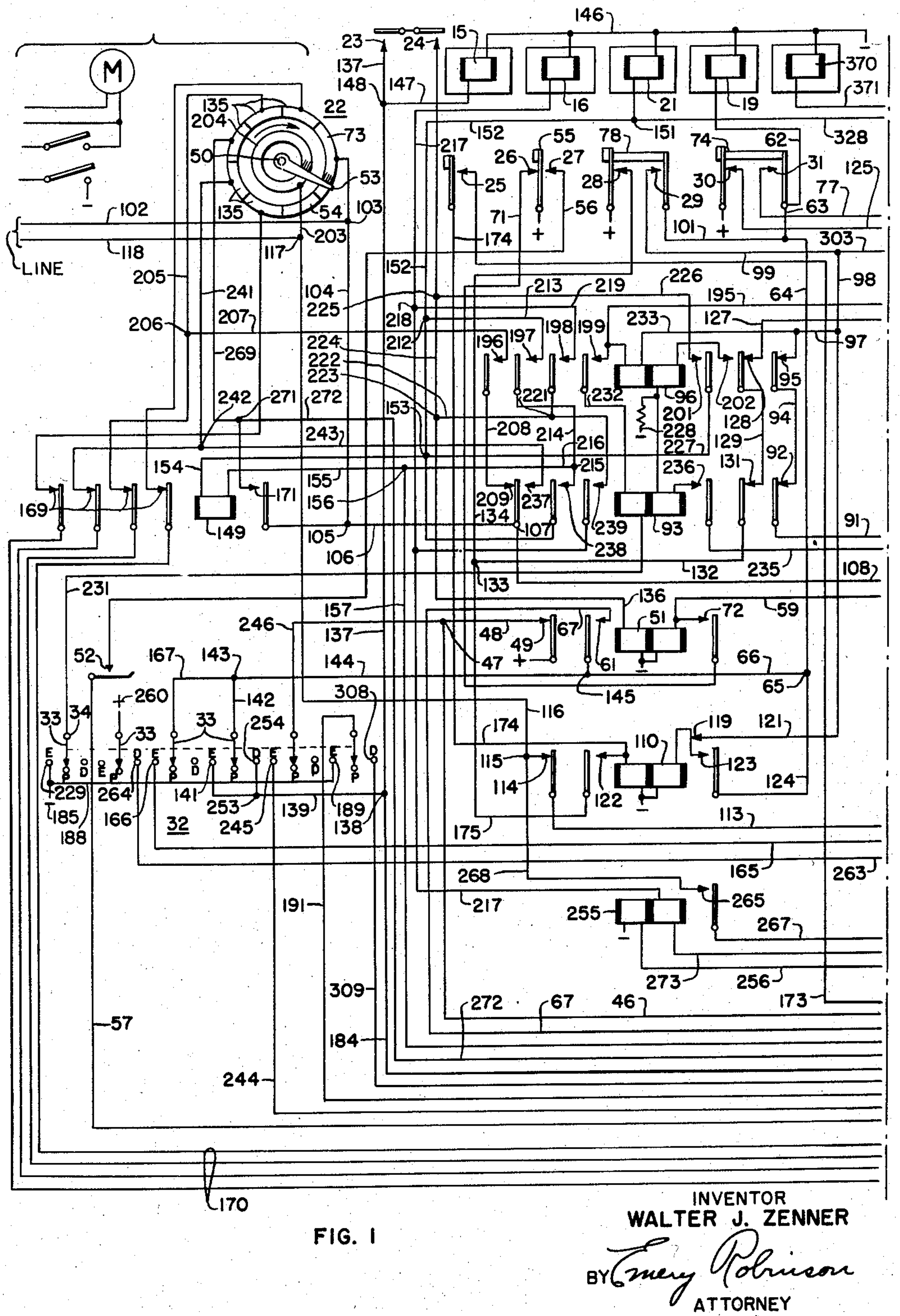
Figs. 1, 2 and 3 are component parts of a circuit arrangement of the system according to the present invention.

The key tape transmitter 11 is exemplified in Fig. 2 by the spacing and marking contacts 13 and 14, respectively, and in Fig. 1 by the tape stop or "unlock" magnet 15 and "block step" (tape stepping suppression) magnet 16. Similarly, the message tape transmitter 12 is exemplified in Fig. 2 by the spacing and marking contacts 17 and 18, respectively, and in Fig. 1 by the tape stop or "unblock" magnet 19 and the block step magnet 21. It is contemplated that the two tape transmitters or tape sensing units 11 and 12 be cooperatively associated with a single brush-type distributor 22 (Figs. 1 and 5).

Associated with the tapes 10 and 20, in well known manner, are the tape-out contacts 23 and 24 (Fig. 1) which are connected in series. Operably associated with suitable cams (not shown) carried on the main shaft 50 in the distributor unit 22 are cam-operated contacts 25, 26, 27, 28, 29, 30, and 31. A three-position manual control switch 32, schematically indicated in Fig. 1, is provided to control various circuits in the encipher, plain and decipher positions of the circuit arrangement shown in Figs. 1, 2 and 3. This switch will be referred to herein as the EPD switch 32. Each section of the EPD switch 32 is provided with a three-position contact arm 33 fixed to a common shaft 34, so that when the control button (not shown) is operated, all of the arms 33 will simultaneously rest on their respective E contacts, P contacts or D contacts, as the case may be. For convenience of description, further sections of the EPD switch 32 have been shown in Fig. 2 (upper and lower right-hand corners).

Figure 3:
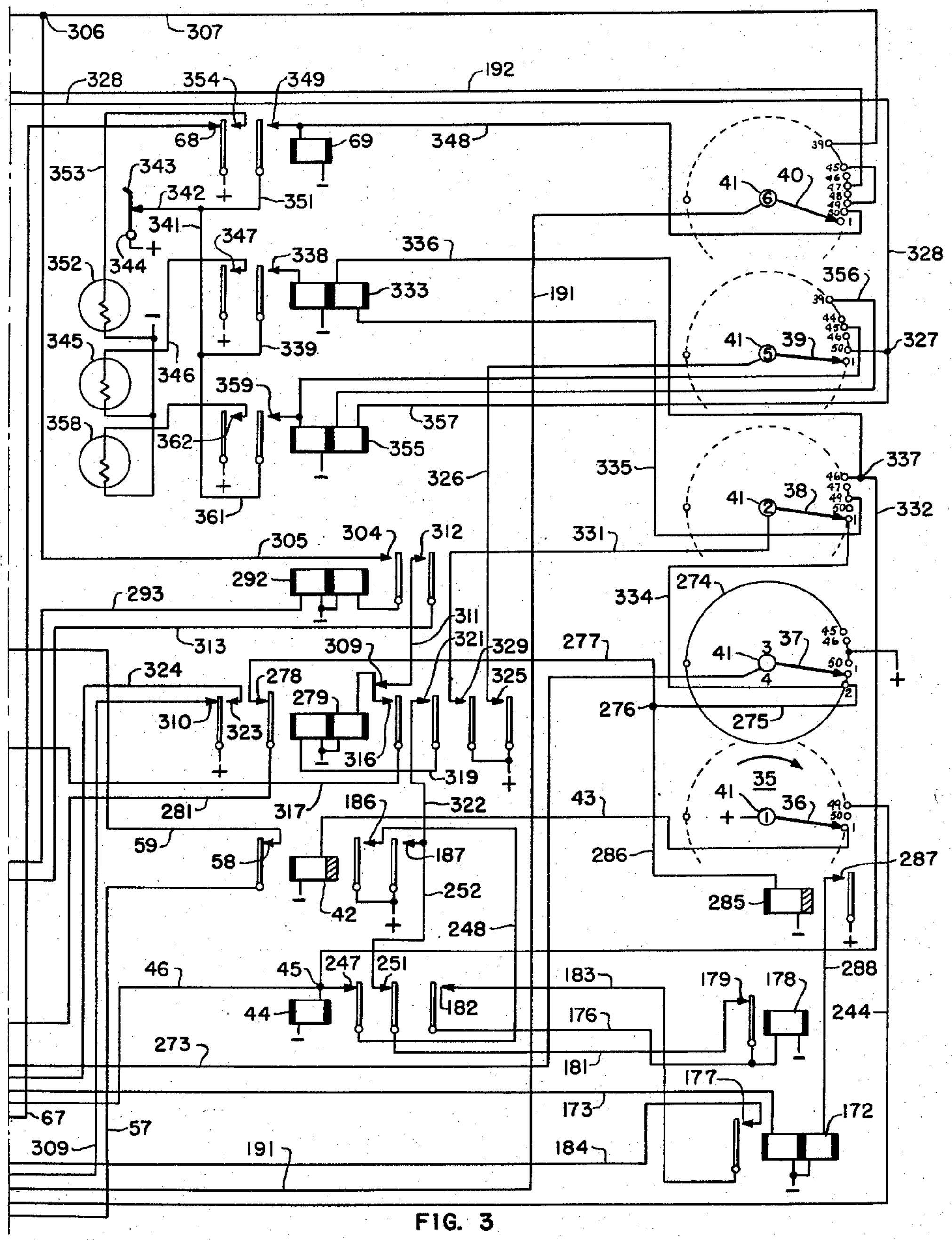
Figure 4:
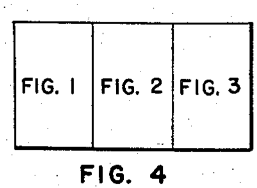
Fig. 4 is a view showing the relative arrangement of Figs. 1, 2 and 3.

In Fig. 3 is shown a circular stepping or counting switch device 35 having contact arms 36, 37, 38, 39 and 40 fixed to common shaft 41. The function of switch 35 is to control the automatic insertion of the carriage return and line feed signals, as will hereinafter appear. The rotary selector brushes 36—40 normally rest on terminal No. 1, operating the "home" relay 42 (Fig. 3) over a circuit extending from positive battery, over shaft 41, over arm 36, through terminal No. 1 over conductor 43, and through the winding of relay 42 to negative battery. The "zero" relay 44 (Fig. 3) is now operated over a circuit extending from negative battery, through the winding of relay 44 to junction 45, over conductor 46 to junction 47 (Fig. 1), over conductor 48, through contact 49 (now closed) of "start" relay 51, over its armature to positive battery.

In sending "plain" or clear text the EPD switch 32 is manually set so that all of the contact arms 33 are in the "P" (plain) position (as shown). The operator then places the message tape 20 containing clear text in the transmitter 12 and operates the nonblocking start key to close the contact 52 (Fig. 1). While the distributor brush arm 53 engages the "start" segment 54, a cam on the distributor shaft 50 acts upon switch arm 55 to close the contact 27 to complete an energizing circuit for the start relay 51 extending from positive battery, over switch arm 55, through contact 27 (now closed), over conductor 56, through contact 52 (still closed), over conductor 57, through closed contact 58 of energized relay 42 (Fig. 3), over conductor 59, then through a winding of start relay 51 to negative battery. Relay 51, upon energizing, opens its contact 49 thereby breaking the previously described energizing circuit for the "zero" relay 44. Also, relay 51 when energized closes its contact 61 to complete an energizing circuit for the "unlock" magnet 19 extending from negative battery, through the winding of magnet 19 (Fig. 1), over conductors 62, 63, and 64 to junction 65, over conductor 66, through contact 61 (now closed), over conductor 67, then through contact 68 (now closed) of relay 69 (Fig. 3), to positive battery. Magnet 19 thus attracts its armature (not shown) to release the transmitter bail for operation. During the rotation of the distributor brush arm 53 the cam on shaft 50 causes switch arm 55 to open contact 27 and to close contact 26 thereby completing a locking circuit for the "start" relay 51 from positive battery, over switch arm 55, through contact 26 (now closed), over conductor 71, through contact 72 (now closed) and through the winding of relay 51 to negative battery. Upon the locking of start relay 51, the operator may open the start key 52. All this time the signal line remains closed.

When the brush arm 53 nears the stop segment 73 upon the first cycle, a cam (not shown) on shaft 50 acts upon switch 74 to permit contact 31 to open and contact 30 to close. The tape sensing fingers in the tape transmitter 12 have explored or read the tape 20 in well known manner and have positioned the transmitting contacts 17—18 (Fig. 2) to correspond to the code combination of perforations sensed. For each closed contact 17 (indicative of spacing position) a message relay 71—1 to 5 (Fig. 2) operates over a circuit extending from negative battery, through the right-hand winding of a relay 75—1 (for example), over conductor 76, through contact 17 (of pulse No. 1), over common conductor 77, through contact 31 (now closed), over conductors 63, 64 and 66, through contact 61 (still closed), and over conductor 67 (as previously described) and through contact 68 (Fig. 3) to positive battery. If any of the other spacing contacts 17 are closed at this time (in accordance with the code combination just sensed), their associated relays 75 will be operated over the circuit just traced.

During the traversal of the stop segment 73 by the brush 53, another cam (not shown) on shaft 50 operates on switch 78 to open contact 28 and close contact 29 (Fig. 1). Upon closure of contact 29 the storing relays 80—1 to 5 become operated in a manner to correspond to the unoperated relays 75—1 to 5. For example, it was just shown that relay 75—1 became energized, thus closing its contacts 81, 82, 83 and 84 and opening its contacts 85 and 86. Because contact 81 has been closed, the relay 80—1 cannot operate, since contact 14 associated with conductor 87, in a possible energizing circuit for relay 80—1, is still open. On the other hand, the companion contact 13 associated with the conductor 88 is closed, while the contact 85 (also associated with conductor 88) is now open. Therefore, no energizing circuit can be completed for relay 80—1 under the described condition wherein relay 75—1 is energized.

However, if tape reader contact 18 (associated with relay 75—1) had been closed (instead of contact 17) then the relay 75—1 would not have been operated, and its contact 85 would have remained closed, and accordingly, an energizing circuit for relay 80—1 would be completed from negative battery, through the right-hand winding of relay 80—1, over conductor 89, through contact 85, over conductor 88, through contact 13, over conductor 91, through contact 92 of relay 93 (Fig. 1), over conductor 94, through contact 95 of carriage return relay 96, over conductors 97, 98 and 99, through contact 29 (now closed), over conductors 101, 64, and 66, through contact 61 (still closed), over conductor 67 (Figs. 1, 2 and 3) and through contact 68 (of relay 69) to positive battery.

The signal line is normally closed through the circuit shown in Figs. 1 and 2 and is traced from conductor 102 (Fig. 1) to junction 103, then over conductor 104 to junction 105, then over conductor 106 to terminal 107, thence over conductor 108 to junction 109 (Fig. 2), then over conductor 111 to junction 112, then over conductor 113 and through contact 114 (now closed) of relay 110, to junction 115, then over conductor 116 to junction 117, then over line conductor 118. Upon the closure of contact 29 (as just mentioned) the relay 110 is energized over a circuit extending from negative battery, through the winding of relay 110, through contact 119 (of make before break contact), over conductors 121, 98 and 99, through contact 29 (now closed), over conductors 101 and 64 to junction 65, over conductor 66, through contact 61 (still closed) of relay 51, then over conductor 67 and through contact 68 (still closed), to positive battery. The energization of relay 110 thus causes the signal line (just traced) to open at contact 114. Relay 110 when thus energized also closes its contacts 122 and 123, and opens contact 119. A locking circuit is completed for relay 110 from negative battery, through the winding of relay 110, through contact 123 (now closed), over conductor 124 to junction 65, thence over conductor 66, through contact 61 (still closed), over conductor 67 and through contact 68 (still closed), to positive battery.

A moment later the switch 74 is permitted by its cam to again close contact 30 and open contact 31, thereby completing locking circuits for all operated relays 75—1 to 5 from negative battery, through the winding of left relay 75—1 (for example), through contact 82 (now closed), then over common conductor 125, through closed contact 30 to positive battery. Soon thereafter the switch 78 is caused by its cam to again close contact 28 and to open contact 29, thereby completing locking circuits for all operated relays 80—1 to 5 from negative battery, through the winding of relay 80—1 (for example) through contact 126 (now closed), then over conductor 127, through closed contact 128 of unoperated relay 96, over conductor 129, through closed contact 131 of unoperated relay 93, over conductor 132 to junction 133, then over conductor 134 and through closed contact 28 to positive battery.

The output or product relays 80—1 to 5 mark the segments 135 of distributor 22 to correspond to the code combination sensed in the tape. Thus, the signal is stored in the relays 80—1 to 5, and accordingly, the sensing pins of the tape reader may now leave the tape and change their contact settings without effect on the code combination being sent by the distributor brush 53. The tape pins fall, the tape advances, and if the operator still holds the start key contact 52 closed, the tape sensing pins rise and set their contacts for the new code combination. When the switch 74 again shifts, the newly selected relays 75—1 to 5 operate, the unwanted or unselected ones release or stay unoperated. Similarly, the relays 80—1 to 5 are reset for the new character.

Assuming now that the transmission of the "plain" message is completed, the operator releases the "start" key to open its contact 52 which will allow "start" relay 51 to release when the switch 55 has been operated to open its contact 26 during the transmission of the "start" impulse. Relay 51 upon releasing opens its contact 61 which causes the circuit (previously traced) for the "unlock" magnet 19 to be opened. The armature (not shown) of the magnet 19, therefore, is released to latch the transmitter bail (not shown) to hold down the tape sensing pins and feed pawl. To permit accurate transmission of the last code combination sensed, the "line-shorting" relay 110, and the selectively operated relays 75—1 to 5 and 80—1 to 5 are held operated until released by the opening of the locking contacts 28 and 30 of switches 78 and 74, respectively, during the next "stop" pulse. The release or de-energization of the "line-shorting" relay 110 permits the contact 114 thereof to close to restore the shunt (previously traced) to the signal line.

*Enciphering*

In sending enciphered messages the operator places the message tape 20 containing clear text in the transmitter 12 (Fig. 5), and the key tape 10 in the transmitter 11. The operator then sends the message heading in "plain" or clear text from a keyboard or from the tape, as previously described. After determining that the message tape 20 is properly "keyed" or phased with the predetermined code combination in the key tape 10, the operator manually sets the EPD switch 32 so that all of the contact arms 33 thereof are in the "E" position, and then operates the start key to close the contact 52 momentarily. "Start" relay 51 operates over the previously traced circuit from positive battery through contact 27 (when cyclically closed) of "start" switch 55. However, since contact 52 is now only closed momentarily, the "start" relay now locks up through its secondary winding over a circuit extending from negative battery, through the secondary winding of relay 51, then over conductor 136, through tape-out contacts 24 and 23, over conductor 137 to junction 138, over conductor 139 to "E" terminal 141, over contact arm 33, over conductor 142 to junction 143, over conductor 144 to junction 145, through contact 61 (now closed), over conductor 67 and through contact 68 (Fig. 3) to positive battery. At the same time, both unlock magnets 15 and 19 are operated. Unlock magnet 19 of the message ("plain") tape transmitter 12 is operated to initiate operation thereof over the circuit previously described including closed contact 61 of relay 51. Moreover, unlock magnet 15 of the key tape transmitter 11 is operated, to initiate operation of said transmitter 11, over a circuit extending from negative battery, over common conductor 146 (Figure 1), through winding of unlock magnet 15, over conductor 147 to junction 148, over conductor 137 to junction 138, over conductor 139 to "E" terminal 141, over brush arm 33, over conductors 142 and 144 to junction 145, through contact 61 (still closed), then over conductor 67 and through contact 68 to positive battery.

Since both of the unlock magnets 15 and 19 are now energized to initiate the operation of their respective tape transmitters 11 and 12, the sensing pins of both these transmitters begin to sense the tapes. Moreover, the "space" insert relay 149 (Fig. 1) now becomes energized over a circuit (including the "block step" magnet 21 of message transmitter 12) extending from negative battery, over common conductor 146, through the winding of magnet 21, to junction 151, over conductor 152 to junction 153, over conductor 154, through the winding of relay 149, over conductor 155 to junction 156, then over conductors 157 and 158 to terminal 159, then through contacts 161, 162, 163, and 164 (now closed) of unoperated relays 80—4, 80—2, 80—5, 80—1, respectively, then over conductor 165 to "E" terminal 166, over associated contact arm 33, over conductors 167 and 144 to junction 145, then through contact 61 (still closed), over conductor 67, and through contact 68 to positive battery.

As previously described, during the traversal of the stop segment 73 by the brush 53, a cam on shaft 50 operates on switch 78 to open contact 28 and close contact 29. Upon closure of contact 29 the "line shorting" relay 110 becomes energized over a circuit previously described through its contact 119, and becomes locked up through its contact 123. As also previously described, the cam controlled switch 74 (Fig. 1) is operated by a cam on shaft 50 when the brush arm 53 nears the stop segment 73 upon the first cycle, thus permitting contact 31 to open and contact 30 to close. The tape sensing fingers in the tape transmitters 11 and 12 have read the tapes 10 and 20 simultaneously in well known manner, and have positioned the contacts 13—14 and 17—18 to correspond to the code combinations of perforations sensed. For each closed contact 17 (indicative of spacing position) a message relay 75—1 to 5 operates over a previously described circuit. It was previously mentioned in connection with the transmission of plain text that a storing relay 80—1 to 5 became operated when a relay 75—1 to 5 was unoperated, and vice versa. This was because there was no key tape in transmitter 11, and hence all contacts 13 were closed.

Now, in connection with the transmission of enciphered signals, there is a key tape in the transmitter 11, and the contacts 13—14 will be conditioned in accordance with the perforations in the key tape. Accordingly, contacts 13—14 will now be set permutably, and thus the storing relays 80—1 to 5 will be operated only when the corresponding perforations in the two tapes differ; that is, one is "spacing" (unperforated) and the other is "marking" (perforated). For example, if the left-hand spacing contact 17 is closed to effect the operation of relay 75—1, then relay 80—1 will be operated only if the marking contact 14 (of the left-hand pair) is closed. Conversely, if the marking contact 18 of the left-hand pair is closed, the relay 75—1 will remain unoperated and its contact 85 will remain closed. Therefore, when the left-hand spacing contact 13 is also closed, then the relay 80—1 will be energized to close its contact 168. As previously mentioned, the output or product relays 80—1 to 5 mark the segments 135 of distributor 22 to correspond to the code combination which is the resultant code or cipher product of the two tapes 10 and 20, thus the signal code combination of impulses transmitted is the cipher product of the two tapes.

As previously alluded to, the present invention facilitates the monitoring of enciphered messages when transmitted over commercial printing telegraph channels, and is achieved by assuring the rejection of predetermined unwanted functions and substituting in lieu thereof a "space" code combination, which, during the deciphering process, serves as a cue to "recipher"; that is, the decipher machine can note the deleted character and restore it. Thus, if the output or cipher product is the "figures," "blank," "carriage return," "line feed," or "space" code combination, the "space insert" relay 149 remains operated in series with the "block step" magnet 21 of the message transmitter 12. Relay 149, upon energizing, opens its contacts 169 and closes its contact 171. By opening its contacts 169, relay 149 thus disconnects the distributor 22 from the contacts 168 of the output relays 80—1 to 5 over conductors 170. Also, by closing its contact 171, relay 149 marks the No. 3 segment 135 of the distributor 22 so that the "space" code combination will be transmitted instead of the unwanted function code signal.

Since it is recalled that the enciphered code results from the combining of two phased code combinations, one in the key tape and one in the message tape, and since it is possible that the resultant cipher code combination is a function code signal, provision is made in the arrangement according to the present invention to automatically substitute a "space" code signal for said function code signal and then to step only the key tape one step while preventing the stepping of the message tape. Thus, the same message code signal is now combined with a new key code combination thereby producing a new cipher product or resultant code signal. Now, if the resultant or cipher product is not a function code signal, then both tapes 10 and 20 will be stepped along at the usual one step pace. However, if the new cipher product is still a function code signal, then the key tape will be stepped one more step while the message tape still remains quiescent. This procedure will continue until the cipher product is other than a function code signal, after which both tapes 10 and 20 will again step together. In other words, since the character in the message tape must be re-used for another trial encipherment, the "block step" magnet 21 prevents message tape advance. The key tape advances as usual and the output relays 80—1 to 5 are reoperated to re-position the contacts 168 for the next cipher product. If this, too, is an unwanted function, it is rejected and the "space" signal is again transmitted in lieu thereof. Thus, in the system according to the present invention, the "space" code signal is a cue to "recipher." Therefore, when the output is an acceptable code signal (non-function), the "space insert" relay 149 and the "block step" magnet 21 are released by the opening of contacts 161, 162, 163 and/or 164 of the output relays 80—1 to 5.

It is to be noted that in the foregoing description, the "letters" code combination was not deemed to be an unwanted function to be substituted by a space signal as a "recipher" cue. This is because, in the present instance, a type bar carrying some sort of symbol is provided in the printer. Thus, the "letters" code is counted as a character code signal, and hence is counted by the counting device 35. However, in the event a type bar is not provided for the "letters" signal, it is then not desired to count this signal on the character counting device 35. Therefore, in that event, the stepping of the counting device is prevented or blocked momentarily under the control of a blocking magnet 370, Fig. 1. Thus, whenever the resultant signal during encipherment is a "letters" signal, and is setup on the relays 80—1 to 5, a circuit for energizing the blocking magnet 370 is completed from negative battery, through the winding of magnet 370, over conductor 371, through closed contacts 372, 373, 374, 375 and 376 (because the "letters" signal is an all-marking signal, and all relays 80—1 to 5 will be energized), then over conductor 165 to the "E" terminal 166, over associated contact arm 33, over conductors 167 and 144 to junction 145, then through contact 61 (still closed), over conductor 67, and through contact 68 to positive battery.

*Automatic carriage return and line feed*

As previously mentioned, the transmitter, at regular intervals, stops ciphering long enough to send "carriage return" and "line feed" code signals, so that, with the suppression of the unwanted characters, plus the automatic addition of wanted functions, a printed copy is produced which would be suitable for monitoring by a page printer, wherein lines of approximately 60 characters in length will be printed.

Thus, when the "line shorting" relay 110 first operated to permit transmission of a code signal by opening its contact 114, it also closed its contact 122 to complete a circuit for the pulsing relay 172 (Fig. 3) extending from negative battery, through the left-hand winding of relay 172, over conductor 173, through closed contact 25 (Fig. 1), over conductor 174, through contact 122 (now closed), over conductors 175 and 134 and through contact 28 (now closed) to positive battery. Relay 172 upon operating, closes its contacts 177. The closure of contacts 177 completes a circuit for energizing the rotary selector drive magnet 178 (Fig. 3) extending from negative battery, through the winding of magnet 178, over conductor 176, through contact 182 (now closed), over conductor 183, through contact 177 (now closed), over conductor 184 to junction 138 (Fig. 1), then over conductor 139 to terminal 141 of the EPD switch 32, over respective switch arm 33, over conductors 142 and 144 to junction 145, then through contact 61 (now closed) of relay 51, over conductor 67, and through contact 68 (Fig. 3) to positive battery.

During the 4th pulse, cam contacts 25 are opened, thereby breaking the afore-described circuits for relays 172 and 178 causing said relays to release so that the switch arms of the rotary switch 35 advance to the second terminal thereby breaking the previously described circuit for the "home" relay 42 thereby permitting contact 58 to open and contacts 186 and 187 to close. As each character code signal is transmitted, the rotary selector 35 is advanced or stepped one step until forty-five character signals have been transmitted and the selector arms 36—40 rest on the 46th terminal. In this condition of rotary switch 35, the switch arm 40 of arc 6 completes a circuit for the carriage return relay 96 extending from negative battery 185 (Fig. 1), over conductor 188 to terminal 189 of the EPD switch 32, over the associated contact arm 33, then over conductor 191 to arc 6 of rotary switch 35, then over switch arm 40, through terminal 46 of arc 6, then over the connector between terminals 46 and 47 of arc 6, over conductor 192 to terminal 193 of the EPD switch (the portion of which is shown at the top of Fig. 2), then over associated switch arm 33 to terminal 194, over conductor 195, through the left-hand winding of the carriage return adding relay 96 (Fig. 1), over conductors 233, 97, 98 and 99, through contact 29 (when closed), over conductors 101, 64 and 66, through contact 61 (now closed), over conductor 67 and through contact 68 (still closed) to positive battery (Fig. 3).

When the contact 29 of the cam operated switch 78 closes, the carriage return adding relay 96 will operate to close its contacts 196, 197, 198, 199, 201 and 202 and open its contacts 95 and 128. Upon the closure of contact 196, the No. 4 segment 135 of distributor 22 is marked for transmission of the carriage return signal. That is, the relay 96 controls the automatic transmission of the carriage return signal by closing its contact 196 so that upon the ensuing rotation of brush arm 53 of the distributor 22, spacing impulses will be impressed upon the signal line 102—118 through the Nos. 1, 2, 3 and 5 segments 135, and a marking impulse will be impressed on the signal line through the No. 4 segment 135 over a circuit extending from signal line 118 to junction 117, then over conductor 203, through collector ring 204 of the distributor 22, over the brush arm 53, through the No. 4 segment (when brush arm 53 traverses the No. 4 segment) then over conductor 205 to junction 206, over conductor 207, through contact 196 (now closed), over conductor 208, through normally closed contact 209 of relay 93, over conductor 106 to junction 105, then over conductor 104 to junction 103, and over line wire 102.

Contact 128, when opened, upon the energization of relay 96, breaks the aforementioned locking circuits for the relays 80—1 to 5, thus releasing said relays 80—1 to 5 so that these relays 80—1 to 5 will have no effect upon the distributor 22 while the latter is transmitting the carriage return signal. The circuit for the space insert relay 149 normally including conductors 152, 154 and 155 will be short-circuited over the circuit extending from junction 212 on conductor 152, over conductor 213, through contact 197 (now closed), over conductor 214 to junction 215, and over conductor 216 to junction 156.

With the energization of carriage return adding relay 96 to control the automatic insertion of a carriage return signal, both block step magnets 16 and 21 are energized upon the closure of contacts 198 and 197, respectively, so that neither the message tape nor the key tape 10 will advance. The block step magnet 21 is energized over a circuit extending from negative battery, over conductor 146, through the winding of magnet 21 to junction 151, over conductor 152 to junction 212, then over the previously described short circuit over conductor 213, contact 197 (still closed), and conductors 214 and 216 to junction 156, then over conductors 157 and 158 to terminal 159, then through contacts 161, 162, 163, and 164 (now closed) of unoperated relays 75—4, 75—2, 75—5, 75—1 respectively, then over conductor 165 to the "E" terminal 166, over associated contact arm 33, over conductors 167 and 144 to junction 145, then through contact 61 (still closed), over conductor 67, and through contact 68 to positive battery. The block step magnet 16 is energized over a circuit extending from negative battery, over conductor 146, through the winding of magnet 16, over conductor 217 to junction 218, then over conductor 219, through contact 198 (still closed), to junction 221, over conductor 222 to junction 223, over conductor 224 to junction 225, then over conductor 226, through contact 201 (now closed), over conductor 227 to junction 153, over conductor 152 to junction 212, then over conductor 213, through contact 197 (still closed), over conductor 214 to junction 215, over conductor 216 to junction 156, then over conductor 157 and the previously traced circuit (for magnet 21) to positive battery at closed contact 68 (Fig. 3).

The carriage return adding relay 96 remains locked up over the following circuit while the "carriage return" signal is sent twice successively. This circuit extends from ground 228, through the right-hand winding of relay 96, through contact 202 (now closed), over conductor 129, through contact 131, over conductor 132 to junction 133, over conductor 134, and through closed contact 28 to positive battery. As previously mentioned, the first carriage return signal is sent automatically when the arm 40 of arc 6 of the rotary selector 35 is on the 46th terminal. The second carriage return signal was sent when the arm 40 was on the 47th terminal. Now, when the selector arm 40 advances to the 48th terminal the circuit from ground (or negative battery) 185 (Fig. 1) and over conductor 191 (previously traced) for the energization of relay 96 is broken, but relay 96 remains operated over its "lock" circuit, previously traced.

Now, when the contact 29 closes, the line feed adding relay 93 (previously shunted) energizes in series with the carriage return adding relay 96 over the circuit extending from negative battery 185 (Fig. 1) to terminal 229 of the EPD switch 32, over the associated switch arm 33 (which is still in the enciphering position), over conductor 231, through the left-hand winding of relay 93, over conductor 232, through contact 199 (still closed), through the left-hand winding of relay 96, over conductors 233, 97, 98 and 99, through the contact 29 (when closed), over conductors 101, 64 and 66 to junction 145, then through contact 61 (still closed) and over conductor 67 and through closed contact 68 (Fig. 3) to positive battery. When the contacts 29, open, the carriage return adding relay 96 de-energizes, but the line feed adding relay 93 remains operated over a circuit extending from positive battery, through lock contacts 30 of cam operated switch 74, over conductor 125 (Figs. 1 and 2) to junction 234, over conductor 235, through contact 236 (now closed) and through the winding of relay 93 to negative battery or ground 228. When thus operated, relay 93 closes its contacts 236, 237, 238 and 293, and opens its contacts 92, 131 and 209.

Upon the closure of contact 237, the No. 2 segment 135 of distributor 22 is marked for transmission of the line feed signal. That is, the relay 93 controls the automatic transmission of the line feed signal by closing its contact 237 so that upon the ensuing rotation of brush arm 53 of the distributor 22, spacing impulses will be impressed upon the signal line 102—118 through the Nos. 1, 3, 4 and 5 segments 135, and a marking impulse will be impressed on the signal line through the No. 2 segment 135 over a circuit extending from signal line 118 to junction 117, then over conductor 203, through collector ring 204 of the distributor 22, over the brush arm 53, through the No. 2 segment (when the brush 53 traverses said segment), then over conductor 241 to junction 242, over conductor 243, through contact 237 (now closed), over conductor 106 to junction 105, then over conductor 104 to junction 103, and over line wire 102.

Upon the ensuing opening of the "lock" contacts 30, after the automatic transmission of the line feed signal, the line feed relay 93 de-energizes in time for the relays 80—1 to 5 to operate properly (in the manner heretofore described) for transmission of the next character. The blockstep magnets 16 and 21 become de-energized, since the contacts of relays 93 and 96, which control these magnets, are opened. While the line feed signal is being automatically transmitted, the switch arms 36 to 40 of rotary switch are stepped to the 49th terminal. An energizing circuit is completed for the "zero" relay 44, through arc 1 of the rotary selector 35, extending from positive battery, over switch arm 36, through terminal 49, over conductor 244, through terminal 245 of EPD switch 32 (Fig. 1), over the associated switch arm 33, over conductor 246 to junction 47, over conductor 46 to junction 45, then through the winding of relay 44 to negative battery (or ground). The "zero" relay 44 becomes locked up over a locking circuit extending from negative battery, through the winding of relay 44, through contact 247 (now closed), over conductor 248, through contact 186 (now closed) of "home" relay 42, to positive battery. It is recalled that the "home" relay 42 is deenergized at this time and that its contacts 186 and 187 are closed, and its contact 58 is open.

With the "zero" relay 44 energized, its contact 251 is closed to complete a circuit for energizing the stepping magnet 178 of the rotary selector 35, extending from negative battery, through the winding of magnet 178, through contact 179 (now closed) of magnet 178, over conductor 181, through contact 251 (now closed), over conductor 252, through contact 187 (now closed) to positive battery. As will be observed, the contact 179 will function as an interrupter because its contact spring will be alternately attracted and released so long as contacts 187 and 251 remain closed. The stepping magnet 178 will thus function to step the rotary selector 35 to its "home" position with the switch arms 36 to 40 on their No. 1 terminals. When the switch arm 36 reaches the No. 1 terminal, a circuit for energizing the "home" relay 42 is completed from positive battery, over arm 36, through No. 1 terminal (of arc 1), over conductor 43, and through the winding of relay 42 to negative battery. Pursuant thereto the contacts 186 and 187 upon opening will break the interrupter circuit for magnet 178. Also, contact 186 upon opening will break the locking circuit for the "zero" relay 44. Thus, the control of the stepping of the rotary selector 35 is returned to the stepping cam contacts 25 by way of the pulsing relay 172.

Therefore, in accordance with the automatic carriage return and line feed feature of the present invention, it is noted that the recurrent operations of carriage return and line feed will cause the insertion of two "carriage returns" and one "line feed" into the cipher product after every 45 characters are transmitted.

When the tape supply for one or both of the transmitters 11 and 12 is exhausted, then one or both of the contacts 23 and 24 will open, thereby breaking the circuit through the left-hand winding of relay 51. The resultant closing of contacts 49 of relay 51 will cause the "zero" relay 44 to energize over the previously described circuit through contact 49. The energization of relay 44 causes the stepping relay 178 to operate through contacts 179, 251 and 187 until the switch arms 36 to 40 of rotary switch 35 rest on the No. 1 terminals, whereupon the "home" relay 42 operates to open contact 187 to terminate the stepping operation. Contact 186 also opens to break the locking circuit for the "zero" relay 44. Furthermore, contact 58 of the "home" relay 42 closes to prepare the circuit for relay 51 when the start key is operated to close contact 52.

The enciphering process, just described, has delivered to the signal line 102—118, impulses suitable for use on lines monitored by page printers. The control circuit according to the invention provides automatic carriage return and line feed signals, eliminates unwanted functions and regulates the length of line to substantially 45 lower case characters (space may occur at either end). Thus, the monitor printer attendant may consider the line as working satisfactorily if the enciphered body of the message is free of upper case characters and has all lines, except the last, substantially 45 characters long. The cipher product tape will reflect the foregoing result.

*Deciphering*

In the deciphering process, the operator loads or inserts the cipher product tape in the message transmitter 12, and also inserts the proper key tape 10 in the transmitter 11. The operator may then send the message tape heading in "plain" or clear text from a keyboard or tape as previously described. After determining that the message tape 20 is properly keyed or phased with the predetermined code combination in the key tape 10 (that is, that both tapes are set on the proper character), the operator manually sets the EPD switch 32 so that all of the contact arms 33 thereof are in the "D" (that is, decipher) position, and then operates the start key to close the contact 52 momentarily. "Start" relay 51 operates over the previously traced circuit from positive battery through contact 27 (when cyclically closed) of "start" switch 55. However, since contact 52 is now only closed momentarily, the "start" relay now locks up through its secondary winding over a circuit extending from negative battery, through the secondary winding of relay 51, then over conductor 136, through tape-out contacts 24 and 23, over conductor 137 to junction 138, over conductor 139 to junction 253, then through the "D" terminal 254, over associated switch arm 33 (now in the "D" or decipher position), over conductor 142 to junction 143, over conductor 144 to junction 145, through contact 61 (now closed), over conductor 67 and through closed contact 68 (Fig. 3) to positive battery. At the same time, both unlock magnets 15 and 19 are operated over previously traced circuits to initiate the operation of their respective transmitters 11 and 12. Of course, the circuit for magnet 15 will now extend through the "D" terminal 254. The sensing pins of both these transmitters begin to sense the tapes.

The operations continue as for enciphering, already described. The distributor 22 sends over the signal line the product of the two tapes 10 and 20 (which is "plain" text) so that an associated typing reperforator can reproduce the original message. As previously mentioned, the present invention facilitates the monitoring of enciphered messages when transmitted over commercial printing telegraph channels, and is achieved by assuring the rejection of predetermined unwanted functions and substituting in lieu thereof a "space" code combination, which, during the deciphering process, serves as a cue to "recipher"; that is, the decipher machine can note the deleted character and restore it.

In the deciphering process, the space signals appearing in the cipher product tape, which were inserted therein as a recipher cue, will be deleted; that is, they will not appear in the perforated tape copy of the original message. To achieve this deletion, a "space delete" relay 255 is provided which functions to short circuit the signal line to suppress the character, and both tapes 10 and 20 advance to the next character at the usual time. The present invention contemplates the utilization of the Baudot code, according to which the "space" code signal comprises a code combination in which the first, second, fourth and fifth impulses are of no-current or spacing nature, and the third impulse is of current or marking nature. As previously described, the contacts 17 and 18 of the message tape transmitter will be so positioned in response to the space code signal that relays 75—1, 2, 4 and 5 will become energized, and the relay 75—3 will remain unenergized. Thus, the energizing circuit for the "space delete" relay 255 will be completed from negative battery, through the winding of the relay 255 (Fig. 1), over conductor 256 to junction 257, then through contact 258, through contacts 259, 261, 262 and contact 83 (now closed), over conductor 263, through terminal 264 of EPD switch 32, over associated switch arm 33, to positive battery 260.

Relay 255 thereupon closes its contact 265 to short circuit the signal line, which short circuit is traced as follows: from line conductor 102 to junction 103, over conductor 104 to junction 105, over conductor 106 to terminal 107, then over conductor 108 to junction 109, over conductor 111 to junction 112, then over conductors 266 and 267, through contact 265 (now closed), over conductor 268 to junction 115, over conductor 116 to junction 117, then over line conductor 118.

It is observed that conductors 170 connect the output contacts 168 of output relays 80—1, 2, 4 and 5 to contacts 169 of relay 149 (Fig. 1). The output contact 168 of the output relay 80—3 is connected to the line over the following circuit: from line conductor 118 to junction 117, over conductor 203 to collector ring 204, over brush arm 53, through the No. 3 segment 135, over conductor 269 to junction 271, then over conductor 272, through contact 168 (when closed) of relay 80—3, over conductors 266 and 111 to junction 109, over conductors 108 and 106 to junction 105, over conductor 104 to junction 103, then over line conductor 102.

In accordance with the invention, provision is made for the rejection or deletion of character signals other than space signals inserted as previously mentioned. Signals for "carriage return" and "line feed" were automatically inserted during the enciphering process to establish uniform length of lines, and signals for "figures" case and "blank" may have been added by other apparatus used at terminal stations or at intermediate points to handle the message. Thus, the contacts for relays 75—1 to 5 are so wired that for each of the signals, namely, carriage return, line feed, figures and blank, circuits may be traced therethrough as follows: from negative battery (upper right-hand corner of Fig. 1), over conductor 146, through the winding of "block step" magnet 16, over conductor 217, through the right-hand winding of the "delete" relay 255, over conductor 273, through switch arm 37, over arc 274 (because the foregoing signals to be deleted will occur in the first 45 characters in the line) to terminal 2, over conductor 275 to junction 276, then over conductor 277, through contact 278 (now closed) of relay 279, over conductor 281, through terminal 282 of EPD switch, over conductor 283, then variantly through the contacts of relays 75—1 to 5 (according to their permutative response to the carriage return, line feed, blank and "figures" signals) to terminal 284, then over conductor 263 to terminal 264 (Fig. 1) of the EPD switch 32, over the associated switch arm 33 to positive battery 260. In response to this same variant setting of contacts of relays 75—1 to 5, a circuit for the energization of "hold" relay 285 (Fig. 3) is completed from battery 260 (Fig. 1), over switch arm 33 to terminal 264, over conductor 263 to terminal 284 (Fig. 2), then variantly through the permuted contacts of relays 75—1 to 5, over conductor 283, over switch arm 33 to terminal 282, over conductor 281, through contact 278, over conductors 277 and 286, through the winding of "hold" magnet 285 to negative battery. Relay 255 functions through its closed contact 265 to short circuit the signal line 102—118 and thereby prevent transmission of the signals to be deleted. Block step magnet 16 functions to prevent the stepping or advancement of the "key" tape 10, and the "hold" magnet 285 functions to close its contact 287 to complete a circuit for energizing the pulsing magnet 172 from positive battery, through contact 287 (now closed), over conductor 288 and through the right-hand winding of relay 172 to negative battery. The "hold" magnet 285 thus functions through the pulsing relay 172 to prevent the stepping of the rotary switch 35 so that the deleted character is not counted.

Since the key tapes at both the enciphering and deciphering stations must always be kept synchronized and in phase, and because it is a feature of the present invention to automatically add carriage return and line feed signals at the enciphering station after every 45 characters to permit a record to be made on a monitoring printer, a resynchronizing means is provided at the deciphering station which recognizes the added carriage return and line feed signals and thereby controls the advancement or stepping of the key tape to assure proper phasing.

After 45 character signals have been transmitted, the rotary selector 35 has advanced or stepped to the No. 46 terminal, and the key tape has been stepped to the first character of the next group of 45 character signals. The delete relay 255 and block step magnet 16 will energize through the No. 46 terminal of arc 4 over the circuit extending from negative battery, over conductor 146 (Fig. 1), through the winding of magnet 16, over conductor 217, through the right-hand winding of delete relay 255, over conductor 273, through switch arm 37, through the No. 46 terminal of arc 4, to positive battery. Relay 255 thus operates to block or suppress transmission by short circuiting the signal line through contact 265, and magnet 16 operates to suppress or halt the stepping of the key tape 10.

With the sensing of the carriage return code combination in tape 20, the relays 75—1, 2, 3 and 5 will be operated to provide a path through their contacts to energize the "hold" magnet 285 over a circuit extending from negative battery, through the winding of the "hold" magnet 285 (Fig. 3), over conductors 286 and 277, through contact 278 (still closed), over conductor 281 to terminal 282, over associated switch arm 33 of EPD switch 32, over conductor 283, through contacts 289, 291, 261, 262 and 83 in series to terminal 284, over conductor 263, to terminal 264 (Fig. 1), over switch arm 33 to positive battery 260. The "hold" magnet 285 thus operates to freeze or hold the rotary selector 35 to the No. 46 terminal.

Pursuant to the reading of the carriage return signal and the consequent energization of relays 75—1, 2, 3 and 5, a circuit is established for energizing the carriage return recognizing relay 292 (Fig. 3) extending from negative battery or ground, through the left-hand winding of relay 292, over conductor 293, through contact 294, contact 295 (now closed), over conductor 296, through contact 297 (now closed), over conductor 298, through contact 299 (now closed), through contact 84 (now closed), over D terminal 302, over conductors 303 and 99, through contact 29 (now closed), over conductors 101 and 64 to junction 65, over conductor 66 to junction 145, through contact 61 (still closed), and over conductor 67 and through contact 68 (still closed) to positive battery.

Carriage return recognizing relay 292 now locks up over a locking circuit extending from negative battery, through the right-hand winding of relay 292, then through the locking contact 304, over conductor 305 to junction 306, over conductor 307 to the P terminal thence to the D terminal and over the associated switch arm 33 of the EPD switch 32 (upper right-hand corner of Fig. 2), then over conductor 192 to the No. 46 terminal of arc 6 of rotary switch 35, then over switch arm 40 (which is at this time on the No. 46 terminal), then over conductor 191 to the D terminal 308 of the EPD switch 32 (Fig. 1) now in deciphering position, over conductor 309, through contact 310 (now closed) of relay 279 to positive battery.

Due to the slow releasing characteristic of the "hold" magnet 285, the rotary selector 35 remains on the No. 46 terminal while the relays 75—1 to 5 reset or shift to react to the 47th and 48th characters which are carriage return and line feed, respectively. The line feed recognizing relay 279 energizes over a circuit extending from ground or negative battery, through the right-hand winding of relay 279, through make-before-break contact 309 (now closed), over conductor 311, contact 312 (now closed), over conductor 313, through contact 314 (now closed), through contact 315 (now closed), over conductor 296, through contact 297 (now closed), over conductor 298, through contact 299 (now closed), through contact 84 (now closed), over conductor 301, over switch arm 33 to terminal 302, over conductors 303 and 99, through cam operated contact 29 (when closed during cycle), over conductors 101, 64 and 66 to junction 145, then through contact 61 (now closed) and over conductor 67 and through closed contact 68 (still closed) to positive battery. Relay 279 is locked up over a locking circuit extending from negative battery, through the right-hand winding of relay 279, through make-before-break contact 316 (now closed), over conductor 317 to junction 318 (Fig. 2), then over conductor 125 and through cam operated contact 30 (when closed) to positive battery. A second locking circuit for relay 279 is provided, for a purpose which will presently appear, from negative battery, through the left-hand winding of relay 279, over conductor 319, through contact 321 (now closed), over conductor 322 and through contact 187 (when closed upon the arrival of the switch arm 36 at the No. 1 terminal after zeroizing or homing), then to positive battery.

Relay 279 upon energizing, opens its contact 278 to break the previously described circuit for "hold" magnet 285. At the same time, relay 279 opens its contact 310 to break the locking circuit (previously traced) for relay 292. Further, relay 279 closes its contact 323 to complete an energizing circuit for the "delete" relay 255 extending from positive battery, through contact 323 (now closed), over conductors 324 and 256, then through the left-hand winding of relay 255 to negative battery. Relay 279 also closes its contact 325 to complete an energizing circuit for the block step magnet 21 extending from positive battery, through contact 325 (now closed), over conductor 326, over switch arm 39 of arc 5, through terminal 46 and terminal 50 of arc 2 to junction 327, then over conductor 328 to junction 151 (Fig. 1), then through the winding of magnet 21 and over conductor 146 to negative battery. This energization of the block magnet 21 prevents the advancement or stepping of the message tape. Relay 279 also closes its contact 329 to complete an energizing circuit for the zeroizing relay 44 extending from positive battery, through contact 329 (now closed), over conductor 331, over switch arm 38 of arc 2 to the No. 46 terminal thereof, then over conductor 332 to junction 45, then through the winding of relay 44 to negative battery. Relay 44 is locked up over the previously described circuit through contact 186 of relay 42.

As will appear hereinafter, when the switch arm 38 is traversing terminals 47, 48 and 49, an energizing circuit for relay 333 (right-hand winding) will be completed therethrough under certain conditions of operation, but under the presently described condition of operation a short circuit prevents this energization, extending from positive battery through contact 329 of relay 279 to positive battery from contact 186 (now closed) of relay 42. Under the present condition of operation the rotary selector 35 is homing to zero, since the zeroizing relay 44 is now operated, as previously described. With the switch arm 38 resting on the No. 1 terminal of arc 2, a circuit is completed for the energization of the block magnet 16, from positive battery, through contact 329 (still closed) of relay 279, over conductor 331, over switch arm 38, through the No. 1 terminal of arc 2, over conductor 334, through the Nos. 2 and 1 terminals of arc 1 of selector 35, over switch arm 37, over conductor 273, through the winding of relay 255, over conductor 217, through the winding of the key tape block magnet 16, over conductor 146 to negative battery. The key tape 10 is thus blocked against further advancement until the line feed recognizing relay 279 is released or de-energized, as will presently appear.

When the switch arm 36 reaches the No. 1 terminal of arc 1 of selector 35, the energizing circuit for "home" relay 42 is completed, as previously described. Relay 42 when thus energized, opens its contact 187 to break one of the previously described locking circuits for relay 279. However, relay 279 releases or de-energizes only when the cam operated contacts 30 open (in the second locking circuit for relay 279, as previously described), because uncontrolled release may de-synchronize the tapes 10 and 20, or cause mutilation of a transmitted character signal. Relay 279 upon de-energizing opens its contacts 325 and 329 to break the locking circuits, under its control, for the block step magnets 16 and 21. However, since the message tape is still on the line feed code combination, the relays 75—1 to 5 hold the key tape block step magnet 16 energized, through contact 278 (now closed) and terminal 1 of arc 3—4, thereby preventing advance of the key tape 10 while the message tape 20 advances to the first character. Normal transmission is then resumed.

Provision has been made in the present invention for controlling the system in the event the carriage return and line feed signal sequence appears in the message at any but the proper time. For example, if the line feed signal (following the carriage return signal) appears later in the message, the selector 35 will have passed the No. 46 terminal. If the line feed signal (following the carriage return signal) occurs with the selector 35 on any terminal 39 to 44, the key tape 10 must be allowed to catch up with the message tape. If the line feed signal does not occur before the selector 35 reaches terminal No. 50 then it is considered lost, and an alarm is given and the attention of the attendant is required.

If it is assumed first that the line feed signal (following the carriage return signal) appears late in the message, then the selector 35 will have passed the No. 46 terminal. It will be recalled that when the switch arm 37 contacted the No. 46 terminal the block step magnet 16 was operated to arrest the key tape 10 on the first character of the next group of 45 characters. Now, if the line feed signal occurs with the selector 35 on terminal 47, 48 or 49, the operation is the same as for a normal length of line, previously described, except that now the line feed recognizing relay 279 operates the "late" relay 333 in series with the zeroizing relay 44 over the circuit extending from positive battery, through contact 329 (now closed), over conductor 331, over switch arm 38, through terminal 47, 48 or 49, over conductor 335, through the right-hand winding of relay 333, over conductor 336 to junction 337, over conductor 332 to junction 45, then through the winding of relay 44 to negative battery. The "late" relay 333 becomes locked up over a locking circuit extending from negative battery, through the left-hand winding of relay 333, through locking contact 338 (now closed), over conductors 339, 341 and 342, through the "alarm unlock" switch contact 343, through terminal 344 to positive battery. The alarm lamp 345 is illuminated, from positive battery through contact 347 (now closed), over conductor 346, through lamp 345, to negative battery. After the trouble is remedied the alarm unlock switch contact 343 is opened to break the aforementioned locking circuit for relay 333.

If, as previously mentioned, the line feed signal (following the carriage return signal) does not occur before the selector 35 reaches the No. 50 terminal, the line feed signal is assumed to be lost and the "lost" relay 69 will thereupon be energized over a circuit extending from negative battery, through the winding of relay 69 (Fig. 3), over conductor 348, through terminal 50 of arc 6 of selector 35, over switch arm 40 of arc 6, over conductor 191, through terminal 308 of EPD switch 32, over conductor 309, through contact 310 (now closed because no line feed signal has been received to energize relay 279), to positive battery. Relay 69 becomes locked up over a locking circuit extending from negative battery, through the winding of relay 69, through locking contact 349, over conductors 351 and 342, through switch contact 343, through terminal 344 to positive battery. The lamp 352 lights, from positive battery, through contact 354 (now closed), over conductor 353, through lamp 352, to negative battery. The operation of the relay 69 stops all transmission, and the attention of the attendant is required.

If the line feed signal (following the carriage return signals) occurs with the switch arms 36 to 40 of the rotary selector 35 resting on any terminal from No. 39 to No. 44, then the key tape 10 must be permitted to catch up with the message tape 20. Upon receipt of the line feed signal, the line feed recognizing relay 279 energizes, as previously described. However, at this time, a circuit for the energization of the "early" relay 355 is completed from positive battery, through contact 325 (now closed), over conductor 326, over switch arm 39 (of arc 5), through any one of the terminals 39 to 44 (which are tied together), over conductor 356, through the right-hand winding of relay 355, over conductor 357 to junction 327, then over conductor 328 to junction 151, through the winding of message tape block step magnet 21, over conductor 146 to negative battery. Thus, the advancement of the message tape is halted, while the key tape 10 continues to step. Relay 355 locks up over a circuit extending from negative battery, through the left-hand winding of relay 355, through locking contact 359 (now closed), over conductors 361, 341 and 342, through contact 343, through terminal 344 to positive battery. Alarm lamp 358 is illuminated, from positive battery, through contact 362 (now closed), through lamp 358 to negative battery.

Moreover, the relay 279 upon closing its contact 323, completes a circuit for energizing the "delete" relay 255 extending from positive battery, through contact 323, over conductors 324 and 256, through the left-hand winding of relay 255 to negative battery, thereby preventing transmission, as previously described. The key tape 10 continues to advance and the rotary selector 35 continues to step with each revolution of the transmitting shaft. It is observed that the relays 75—1 to 5 are still sensing the line feed signal but relay 279 (by virtue of now open contact 278) has broken their control of rotary selector and key tape advance. When the switch arms 36—40 rest on their respective No. 45 terminals, the energizing circuit for relay 355 and block step magnet 21 through switch arm 39, previously traced, will be broken, thereby releasing the message tape block step magnet 21 so that the message tape 20 and the key tape 10 will both advance one step to the first character of the new group of 45 characters. Advance of the switch arms 36—40 of the rotary selector 35 to their respective No. 46 terminals, again operate the block step magnets 16 and 21, through switch arms 37 and 39 respectively (over previously traced circuits), and also the "zeroizing" relay 44 over switch arm 38. Homing or zeroizing thus takes place as previously described. Both tapes 10 and 20 are set to transmit the first character of the new group of 45 characters, which transmission takes place as soon as the line feed recognizing relay 279 de-energizes.

If a carriage return signal arrives too early; that is, if it appears before 38 character signals have been transmitted, the relays 75—1 to 5 operate the carriage return recognizing relay 292 over the previously described circuit including conductor 293, but relay 292 cannot lock up because the switch arm 40 of arc 6 has not reached the terminals assigned for locking up said relay over the previously described locking circuit. Now, when the relays 75—1 to 5 shift to read the line feed signal, the carriage return recognizing relay 292 de-energizes, opening its contact 312 which is in the previously described energizing circuit for the line feed recognizing relay 279. Accordingly, the relay 279 does not operate, and the carriage return and line feed signals are thus disregarded because they occurred abnormally early. Therefore, unless another carriage return and line feed signal sequence occurs later, before the 49th terminal is reached, the "lost" relay 69 will operate and transmission will be stopped due to the opening of contact 68.

When the tape supply for one or both of the transmitters 11 and 12 is exhausted, the same result occurs as was previously described under the subject of "enciphering."

Although a preferred form of the invention has been disclosed and described, it is manifest that changes may be made in the details set forth without departing from the essentials of the invention.

What is claimed is:

1. In a secret communication system, a message tape transmitter, a key tape transmitter, enciphering means for combining the signals from said transmitters, relay means for storing the resultant combined signals, means cooperably associated with said storing relays for rejecting predetermined resultant signals and substituting a cue signal therefor, a signal counting device, carriage return and line feed signal inserting relays at the transmitting station, means effective under the control of said device to cause said signal inserting relays to insert carriage return and line signals automatically at predetermined times, means at said receiving station for recognizing said carriage return and line feed signals, means at the receiving station responsive to said cue signal to synchronize the keying of the deciphering key tape and enciphered message tape whereby a page printed record is produced, recognition relay means for recognizing within predetermined limits the premature or late appearance of said carriage return and line feed signals, and means operated automatically under control of said recognition relay means to bring the key tape and message tape into step.

2. In a secret communication system, a message tape transmitter, a key tape transmitter, enciphering means for combining the signals from said transmitters, relay means for storing the resultant combined signals, means cooperably associated with said storing relay means for rejecting predetermined resultant signals and substituting a cue signal therefor, a signal counting device, carriage return and line feed signal inserting relays at the transmitting station, means effective under the control of said device to cause said signal inserting relays to insert carriage return and line feed signals automatically at predetermined times, means at said receiving station for recognizing said carriage return and line feed signals, means at the receiving station responsive to said cue signal to synchronize the keying of the deciphering key tape and enciphered message tape whereby a page printed record is produced, recognition relay means for recognizing within predetermined limits the untimely appearance of said carriage return and line feed signals, and means operated automatically under control of said recognition relay means to bring the key tape and message tape into step.

3. In a secret communication system, a message tape transmitter, a key tape transmitter, enciphering means for combining the signals from said transmitters, storing relay means for storing the resultant combined signals, means cooperably associated with said storing relay means for rejecting predetermined resultant signals and substituting a cue signal therefor, a signal counting device, carriage return and line feed signal inserting relays at the transmitting station, means effective under the control of said device to cause said signal inserting relays to insert carriage return and line feed signals automatically at predetermined times, means at said receiving station for recognizing said carriage return and line feed signals, means at the receiving station responsive to said cue signal to synchronize the keying of the deciphering key tape and enciphered message tape whereby a page printed record is produced, relay means for recognizing within predetermined limits the untimely appearance of said carriage return and line feed signals, means effective in response to said inserted carriage return and line feed signals for automatically resynchronizing said tapes, and means responsive to the loss of said inserted carriage return and line feed signals to render the receiving station inoperative.

4. In a secret communication system, a message tape transmitter, a key tape transmitter, enciphering means for combining the signals from said transmitters, storing relay means for storing the resultant combined signals, means cooperably associated with said storing relay means for rejecting predetermined resultant signals and substituting a cue signal therefor, a signal counting device, carriage return and line feed signal inserting relays at the transmitting station, means effective under the control of said device to cause said signal inserting relays to insert carriage return and line feed signals automatically at predetermined times, means at said receiving station for recognizing said carriage return and line feed signals, means at the receiving station responsive to said cue signal to synchronize the keying of the deciphering tape and enciphered message tape whereby a page printed record is produced, relay means for recognizing within predetermined limits the untimely appearance of said carriage return and line feed signals, means effective in response to said inserted carriage return and line feed signals for automatically resynchronizing said tapes, means responsive to the loss of said inserted carriage return and line feed signals to render the receiving station inoperative, and means for indicating said response.

References Cited in the file of this patent

UNITED STATES PATENTS

| | | |
|---|---|---|
| 1,416,765 | Vernam | May 23, 1922 |
| 2,406,023 | Locke | Aug. 20, 1946 |
| 2,406,829 | Haglund et al. | Sept. 3, 1946 |
| 2,504,621 | Bacon | Apr. 18, 1950 |
| 2,549,796 | Frost | Apr. 24, 1951 |
| 2,604,538 | Halvorsen | July 22, 1952 |
| 2,641,641 | Edgar | June 9, 1953 |
| 2,673,236 | Phelps | Mar. 23, 1954 |

UNITED STATES PATENT OFFICE

CERTIFICATE OF CORRECTION

Patent No. 2,874,215 February 17, 1959

Walter J. Zenner

It is hereby certified that error appears in the printed specification of the above numbered patent requiring correction and that the said Letters Patent should read as corrected below.

Column 18, line 25, claim 2, before "relay" insert -- storing --.

Signed and sealed this 26th day of January 1960.

(SEAL)

Attest:

KARL H. AXLINE
Attesting Officer

ROBERT C. WATSON
Commissioner of Patents